United States Patent [19]

Ishida et al.

[11] Patent Number: 5,124,284

[45] Date of Patent: Jun. 23, 1992

[54] ALUMINUM NITRIDE SINTERED BODY

[75] Inventors: Masanobu Ishida; Nobuyuki Ito; Keiko Higashi, all of Kokubu, Japan

[73] Assignee: Kyocera Corporation, Kyoto, Japan

[21] Appl. No.: 533,884

[22] Filed: Jun. 6, 1990

[30] Foreign Application Priority Data

Jun. 7, 1989 [JP] Japan ............ 1-144550

[51] Int. Cl.$^5$ .............. C04B 35/58
[52] U.S. Cl. ............ 501/96; 501/98
[58] Field of Search .............. 501/96, 98

[56] References Cited

U.S. PATENT DOCUMENTS

| 4,650,777 | 3/1987 | Kurokawa et al. | 501/96 |
| 4,698,320 | 10/1987 | Kasori et al. | 501/96 |
| 4,705,762 | 11/1987 | Ota et al. | 501/87 |
| 4,711,861 | 12/1987 | Sawamura et al. | 501/98 |
| 4,764,321 | 8/1988 | Huseby et al. | 264/65 |
| 4,766,097 | 8/1988 | Shinozaki et al. | 501/98 |
| 4,795,724 | 1/1989 | Soma et al. | 501/98 |
| 4,810,679 | 3/1989 | Dole et al. | 501/98 |

FOREIGN PATENT DOCUMENTS

| 59-207883 | 5/1983 | Japan . |
| 60077176 | 9/1983 | Japan . |
| 61-021978 | 7/1984 | Japan . |
| 6121978 | 9/1984 | Japan . |
| 61-200605 | 3/1985 | Japan . |
| 61205670 | 3/1985 | Japan . |
| 62-17076 | 1/1987 | Japan . |
| 2179677 | 3/1987 | United Kingdom . |

Primary Examiner—Mark L. Bell
Assistant Examiner—Deborah Jones
Attorney, Agent, or Firm—Spensley Horn Jubas & Lubitz

[57] ABSTRACT

Disclosed is an aluminium nitride sintered body composed of a sintered body of aluminum nitride, erubium (Er) metal or its compound and calcium (Ca) metal or its compounds, said sintered body containing 1.8 to 10% by weight of an erubium component calculated as an oxide and more than 0 to not more than 2% by weight of a calcium component calculated as an oxide, and consisting of crystal grains of aluminum nitride and an intergranular phase composed mainly of an aluminate other than $Er_3Al_5O_{12}$, said sintered body further having a bulk density of 3.2 to 3.6 g/cm$^3$.

5 Claims, No Drawings

ALUMINUM NITRIDE SINTERED BODY

BACKGROUND OF THE INVENTION

1. Filed of the Invention

This invention relates to an aluminum nitride sintered body and a process for its production. More specifically, it relates to an aluminum nitride sintered body which has high heat conductivity and is suitable as an electronic component part material such as a radiating substrate, and can be fired simultaneously with a conductor material, and to a process for its production.

2. Description of the Prior Art

In recent years, with higher performances and speeds of information processing devices, there has rapidly been a tendency to higher densities and higher integration of semiconductor integrated circuits constituting these devices, and consequently, semiconductor integrated circuit elements have undergone an increased electric power and the amounts of heat which these elements generate markedly increase. Accordingly, to operate the semiconductor integrated circuit normally and stably, the important problem is to remove the generated heat efficiently.

Since semiconductor packages having a conventional alumina substrate have low heat conductivity and radiation is insufficient, a beryllium oxide sintered body was proposed as a ceramic material having high heat conductivity. This material, however, encounters difficulty in use because of its toxicity.

Hence, an attention has been paid to an aluminum nitride sintered body which has various excellent properties, for example, a high mechanical strength at room temperature to a high temperature, high electrical insulation, high heat-conductivity and a coefficient of thermal expansion close to that of a single crystal of silicon as a highly heat conducting substrate material superseding the beryllium oxide sintered body.

Intrinsically, however, aluminum nitride is difficult to sinter, and it is difficult to obtain a high density sintered body having high heat conductivity from aluminum nitride alone. Accordingly, it has been the previous practice to add compounds of elements of Group IIa or IIIa of the periodic table, for example, alkaline earth metals such as calcium, strontium and barium, or compounds of yttrium and rare earth elements as sintering aids to give sintered bodies of high density.

For example, U.S. Pat. No. 4,746,437 discloses that a mixture of an aluminum nitride powder, a compound of a metal of group IIa of the periodic table such as calcium, strontium or barium, and a compound of a metal of group IIIa of the periodic table typified by yttrium is fired. Since the resulting sintered body has insufficient flexural strength, it is susceptible to breakage or cracking during handling. Furthermore, when it is fired simultaneously with a conductor material constituting a wiring at the time of preparing a substrate board, its adhesion strength is insufficient.

U.S. patent application No. 386,789 to the present inventors discloses that by firing a molded article of a composition composed of aluminum nitride, a compound represented by $Yb_bO_3$ or $Er_2O_3$ and a component represented by CaO as oxides, the intergranular phase in the sintered body is removed by volatilization, and aluminum nitride sintered body having increased heat conductivity is produced. This method, however requires firing at high temperatures to volatilize the intergranular phase, and poor fired bodies are formed because the surface of the sintered body is roughened or warpage occurs. Furthermore, the mechanical strength of the sintered body is not entirely satisfactory.

SUMMARY OF THE INVENTION

It is an object of this invention therefore to provide an aluminum nitride sintered body free from the aforesaide defects of a conventional aluminum sintered body and having a combination of high heat conductivity, high density and high mechanical strength and excellent surface smoothness and uniform quality and a process for its production.

Another object of the invention is to provide a process for easily producing at a relatively low firing temperature an aluminum nitride sintered body which has the above excellent properties and can be fired simultaneously with an electric conductor material.

According to this invention, there is provided an aluminum nitride sintered body composed of a sintered body of aluminum nitride, erbium (Er) metal or its compound and calcium (Ca) metal or its compound, said sintered body containing 1.8 to 10% by weight of an erubium component calculated as an oxide and more than 0 and not more than 2% by weight of a calcium component calculated as an oxide, and consisting of crystal grains of aluminum nitride and intergranular phase composed mainly of an aluminate other than $Er_3Al_5O_{12}$, said sintered body further having a bulk density of 3.2 to 3.6 g/cm$^3$.

According to this invention, there is also provided a process for producing an aluminum nitride sintered body, which comprises molding a composition comprising 88 to 98% by weight of aluminum nitride, 2 to 10% by weight of erbium metal or its compound calculated as an oxide, more than 0 to not more than 2% by weight of calcium metal or its compound calculated as an oxide and not more than 3.0% by weight of excessive oxygen calculated as $Al_2O_3$ into a predetermined shape, firing this molded article in a substantially carbon-free nonoxidizing atmosphere at a temperature of 1500° to 2000° C. so that at least 90% of the erbium metal or its compound and the calcium metal or its compound as oxides, based on the added amounts, remain in the sintered body.

DETAILED DESCRIPTION OF PREFERRED EMBODIMENTS

In the present invention, an erbium (Er) metal component belonging to a heavy rare earth element is chosen from the metal components of group IIIa of the periodic table and a calcium (Ca) components is chosen from the alkaline earth metal components, and they are combined and used as sintering aids for aluminum nitride (AlN). When aluminum nitride is fired in the presence of a sintering aid composed of a combination of an erubium component and a calcium component the following advantages are obtained.

(1) The firing can be carried out at a relatively low temperature, and the molded article can be fired homogeneously. The molded article can be fired simultaneously with an electric conductor material such as a metallized layer.

(2) Even when the intergranular phase is left as it is without removing it by volatilization, high heat conductivity can be achieved in the sintered body.

(3) By leaving the intergranular phase in the sintered body, both the interior and the surface of the sintered body are homogenized, and its surface smoothness is increased, and the occurrence of warpage is prevented. The mechanical strength of the sintered body, and its adhesion strength with respect to an electric conductor material can be increased.

(4) Since the removal of the intergranular phase is unnecessary, the sintering step can be simplified.

The erbium compound particularly selected from the rare earth metal components is used for the following reason. As already pointed out, if $Y_2O_3$ generally used is left in the intergranular phase, color unevenness and stains may occur or localized nonuniformity in heat conductivity may occur in the sintered body and it is difficult to produce a sintered body having good heat conductivity. The strength of the sintered body tends to become lower. If the intergranular phase in the sintered body is removed to eliminate this defect, firing at high temperatures in a carbonaceous atmosphere becomes necessary, and the resulting sintered body tends to develop surface roughness or warpage, and does not have sufficient strength. When a light rare earth element metal component such as a neodymium (Nd) component is used, similar defects tend to occur. On the other hand, if a heavy rare earth metal component, for example, a Yb component, other than erbium us used, volatilization of these components tends to occur, the stability of the firing is poor, Furthermore, the resulting sintered body tends to develop roughening. These defects can be effectively eliminated by using the erbium component. If the erbium component is singly used, it is difficult to make possible low temperature firing and to leave the intergranular phase. This is why the erbium components is used with the calcium (Ca) component.

It is critical that the sintered body of the invention should contain 1.8 to 10% by weight, especially 4 to 8% by weight, of the erbium calculated as an oxide, and more than 0 but not more than 2% by weight, especially 0.01 to 1.0% by weight, calculated as an oxide of the calcium component. If the content of erbium component ($Er_2O_3$) is less than 1.8% by weight and its amount of mixing at the time of mixing is less than 2.0% by weight, sufficient compaction of the sintered body cannot be achieved even if the amount of the alkaline earth metal is increased. If it exceeds 10% by weight, large amounts of oxygen ($Al_2O_3$) and the unreacted aids remain in the aluminum nitride, and the sintered body becomes non-uniform. If the amount of the alkaline earth metal exceeds 2.0% by weight, the optium firing temperature becomes high.

In the sintered body of this invention aluminum nitride crystal grains and an intergranular phase exist. Another characteristic of this invention is that this intergranular phase is composed of a major proportion of an aluminate other than $Er_3Al_5O_{12}$.

It is known that in an aluminum nitride sintered body obtained by using $Y_2O_3$ as a sintering aid, an intergranular phase composed of a complex oxide of $Y_2O_3$ and $Al_2O_3$ is formed. This complex oxide is of three structures $Y_3Al_5O_{12}$ (YAG), $YAlO_3$ (YAP) and $Y_4Al_2O_9$ (YAM). This corresponding aluminate is formed also in an intergranular phase of the sintered body obtained by using the Er component as a sintering aid. Since in the present invention, a complex oxide of the YAG structure, i.e., $Er_3Al_3O_{12}$, adversely effects the heat conductivity, it is important that the complex oxides other than the YAG structure should be the main components of the intergranular phase. The alumina components in the aluminate is attributed to the excessive oxygen (generally existing in the form of alumina) in the aluminum nitride. This excessive oxygen should desirably be present in an amount of not more than 2.5% by weight, especially to 2.0% by weight. The desirable mole ratio of $Al_2O_3/Er_2O_3$ is $0.5 \sim 5.0$, particularly $1 \sim 4$. Generally, the aluminate in the intergranular phase is composed of at least one aluminate selected from the group consisting of $ErAlO_3$ (YAP type) and $Er_4Al_2O_9$ (YAM type).

The AlN sintered body of this invention generally has a density of 3.2 to 3.6 g/cm$^3$, a heat conductivity of at least 120 W/m.k, and reaching as high as 200 W/m.k and a flexural strength of at least 30 kg/mm$^2$.

If the sintered body has a density of less than 3.2 g/cm$^3$, there are many pores. If its density is more than 3.6 g/cm$^3$, there is much sintering aid which remains unreacted with oxygen in aluminum nitride.

An aluminum nitride sintered body having a bulk density of 3.2 to 3.6 g/cm$^3$ and a heat conductivity of 120 to 200 W/m.k can be obtained by molding a mixture comprising 88 to 98% by weight of aluminum nitride, 2 to 10% by weight of erbium (Er) or its compound calculated as an oxide as a heavy rare earth element, and more than 0 and not more than 2.0% by weight of calcium (Ca) or its compound as a powder calculated as an oxide as an alkaline earth element in a substantially carbon-free non-oxidizing atmosphere at a temperature of 1600° to 2000° C. so that at least 90%, calculated as oxides, of the sintering aids are left in the sintered body and $Er_3Al_5O_{12}$ do not remain in the intergranular phase of the sintered body.

The sintering aids are added as metal elements or compounds, preferably oxides or compounds such as carbonate or nitrates which change to oxides upon firing.

The aluminium nitride powder used in this invention may be produced by a known method such as direct nitridation, or reduction of alumina. Desirably, the aluminium nitride has an oxygen content of 0.4 to 1.5% by weight, not more than 0.1% by weight of cationic impurities excluding aluminum, and a carbon content of not more than 1000 ppm with the ratio of the fluorescent X-ray intensity of sulfur (S) to aluminum (Al) being not more than $10^{-3}$ (excluding 0), because the thermal conductivity and electric characteristics are degraded if sulfur content exceeds the above range.

When the mixing ratio of the aluminum nitride powder to the sintering aids are as described above, the sintering aids form a liquid phase at the time of firing, and the sintering operation proceeds smoothly.

The added powders are mixed as required in an organic solvent. The water contained in the organic solvent is limited to not more than 0.4%. As a result, the dispersibility of the AlN powder is increased, and by the reaction with water in the solvent, the oxidation of the surface of the AlN particle can be prevented.

The resulting mixed powder is molded into a desired shape by a press-molding using a mold or a hydrostatic pressure, sheet formation, extrusion molding, etc., and then fired. At the time of preparing a substrate board a conductor material composed of one or two of W, Mo, Cu and Mn may be formed on the surface of the molded article by a known method such as a screen printing method.

Firing may be carried out in a substantially carbon-free atmosphere for example, nitrogen, hydrogen or a mixture of these, at a firing temperature of 1500° to 2000° C. The firing means may be, for example, pressureless firing or nitrogen gas pressure firing. By hot isostatic pressure firing of the resulting sintered body, its compaction can be promoted.

It is important that sintering should be carried out such that the sintering aids in the molded article are left in a proportion of at least 90% based on the added amounts calculated as oxides. If the amount of the sintering aids left is less than 90% by weight, the volatilization of the sintering aids causes roughening on the surface of the sintered body, and the sintered body loses smoothness whereby the sintered body loses its merchandise value. Further at the time of producing a substrate board, the molded article cannot be fired simultaneously with a conductor material.

According to the invention, in the firing step, the temperature elevation rate from 1200° C. is adjusted to not more than 40° C. on an average per minute. Desirably, before sintering begins to proceed, an aluminate is uniformly formed as a liquid phase component by the reaction of the sintering aids with the oxygen on the surface of the aluminum nitride powder in the molded article. If the temperature elevation rate exceeds 40° C./min., the firing temperature is reached before the aluminate as a liquid phase component is sufficiently formed. Thus, the formation of a liquid phase becomes non-uniform, and warpage and staining tend to occur in the resulting sintered body.

After the firing, it is desirable to lower the firing temperature to 1200° C. at a rate of not more than 40° C. on an average per minute. This enables a non-uniform layer on the surface of the sintered body to be eliminated completely, and the entire product can be homogenized.

The following Examples illustrate the present invention specifically.

EXAMPLE 1

An aluminum nitride powder having an oxygen content of 0.9% by weight, a carbon content of 0.05% by weight, a cationic impurity content excluding aluminum of not more than 0.1% by weight, and a sulfur content of $5 \times 10^{-4}$ (the fluorescent X-ray intensity ratio to Al), an $Er_2O_3$ powder, and a $CaCO_3$ powder were mixed in varying amounts as shown in Table 1. For comparison, a mixed composition was prepared by the same procedure as above except that $Y_2O_3$ instead of $Er_2O_3$. Then, a tape of this mixed composition was molded by a doctor blade method. The resulting tape was degreased, and fired at atmospheric pressure at 1700° C. in a carbon-free atmosphere containing nitrogen. In the firing, the temperature elevating rate from 1,200° C. was 20° C./min, and the temperature lowering rate to 1,200° C. was 20° C./min.

The resulting sample was analyzed by X-ray diffraction to identify the main phase of the intergranular phase. The density of the sintered body was measured by the Archimedes method. The heat conductivity of the sintered body was measured by a laser flash method. The amounts of the sintering aids (calculated as oxides) were measured by an ICP emission spectrophotometric analysis method. The flexural strength of the sintered body was measured by a 4-point bending method.

Each sample was immersed for 30 minutes in an aqueous solution of 4N NaOH and then stirred. The weight loss per unit area of the sample was measured, and its alkali resistance was evaluated.

The results of Example 1 are shown in Table 1.

It is seen from the results given in Table 1 that Samples Nos. 16, 17 and 18 obtained by using $Y_2O_3$ had lower flexural strengths than samples obtained by using $Er_2O_3$.

Samples 1 and 2 in which the amount of $Er_2O_3$ added was less than 2% by weight were sintered insufficiently, and high heat conductivity could not be achieved, and their flexural strengths were low. Sample No. 15 in which the amount of $Er_2O_3$ was more than 10% by weight contained a large amount of an intergranular phase. It had low heat conductivity, and color unevenness and stains occurred.

In sample No. 11 in which the amount of the alkaline earth metal compound exceeded 2.0% by weight, the amount of the intergranular phase was large, and its heat conductivity was low. Sample No. 7 which did not contain the alkaline earth metal compound was sintered insufficiently.

In contrast, Samples Nos. 3-6, 8-10 and 12-14 showed excellent properties as shown by a density of 3.2 to 3.6 $g/cm^3$, a heat conductivity of at least 120 W/m.k and a flexural strength of at least 30 $kg/mm^2$.

EXAMPLE 2

By the same procedure as in Example 1, a conductive paste composed of W was printed on tapes molded from compositions shown in Samples Nos. 4 and 16 of Table 1. After degreasing, the tapes were fired at 1760° C. to prepare substrate boards. To the conductor portion of the substrate boards, a pin was soldered and an outside ping was pulled. The adhesion strength of the metallized layer was measured.

In sample No. 16 in which $Y_2O_3$ as a rare earth element was used, the adhesion strength was 3.1 $kg/mm^2$. But sample No. 4 which contained $Er_2O_3$ as rare earth element had an excellent adhesion strength of 3.9 $kg/mm^2$.

TABLE 1

| Sample No.*[1] | amount (wt. %) | CaO amount (wt. %) | Density of the sintered body (g/cm²) | Main intergranular phase | remaining amount (wt. %) |
|---|---|---|---|---|---|
| | $Er_2O_3$ | | | | |
| 1* | 0.5 | 2.0 | 2.94 | — | 0.48 |
| 2* | 1.0 | 2.0 | 3.22 | — | 0.97 |
| 3 | 2.0 | 1.0 | 3.27 | $ErAlO_3$ | 1.91 |
| 4 | 3.0 | 0.5 | 3.29 | $ErAlO_3$ | 2.90 |
| 5 | 3.0 | 1.0 | 3.30 | $ErAlO_3$ | 2.88 |
| 6 | 3.0 | 2.0 | 3.30 | $ErAlO_3$ | 2.93 |
| 7* | 6.0 | — | 3.08 | $ErAlO_3$ | 5.81 |
| 8 | 6.0 | 0.5 | 3.38 | $ErAlO_3$ | 5.95 |
| 9 | 6.0 | 1.0 | 3.38 | $ErAlO_3$ | 5.88 |
| 10 | 6.0 | 2.0 | 3.38 | $ErAlO_3$ | 5.33 |
| 11* | 6.0 | 4.0 | 3.19 | $Er_4Al_2O_9$ | 5.84 |
| 12 | 10.0 | 0.5 | 3.47 | $Er_4Al_2O_9$ | 9.72 |
| 13 | 10.0 | 1.0 | 3.47 | $Er_4Al_2O_9$ | 9.85 |

TABLE 1-continued

| | | | | | |
|---|---|---|---|---|---|
| 14 | 10.0 | 2.0 | 3.47 | Er$_4$Al$_2$O$_9$ | 9.31 |
| 15* | 15.0 | 1.0 | 3.57 | Er$_4$Al$_2$O$_9$ | 14.53 |
| | Y$_2$O$_3$ | | | | Y$_2$O$_3$ |
| 16* | 3.0 | 0.5 | 3.27 | YAlO$_3$ | 2.86 |
| 17* | 6.0 | 0.5 | 3.30 | YAlO$_3$ | 5.92 |
| 18* | 10.0 | 0.5 | 3.34 | Y$_4$Al$_2$O$_9$ | 9.93 |

| Sample No.*[1] | CaO remaining amount (wt. %) | Amount of oxygen (as Al$_2$O$_3$) of the sintered body | Heat conductivity (w/m·k) | Flexural strength (kg/mm$^2$) | Alkali resistance (mg/cm$^3$) |
|---|---|---|---|---|---|
| 1* | 1.91 | — | 87 | 17 | — |
| 2* | 1.94 | — | 111 | 22 | 4 |
| 3 | 0.96 | 1.88 | 122 | 31 | 6 |
| 4 | 0.48 | 1.75 | 172 | 36 | 6 |
| 5 | 0.97 | 1.74 | 163 | 35 | 8 |
| 6 | 1.93 | 1.78 | 158 | 36 | 6 |
| 7* | — | 1.89 | 114 | 23 | 19 |
| 8 | 0.48 | 1.83 | 149 | 30 | 22 |
| 9 | 0.96 | 1.81 | 148 | 35 | 24 |
| 10 | 1.94 | 1.81 | 142 | 33 | 24 |
| 11* | 3.90 | 1.90 | 118 | 24 | 29 |
| 12 | 0.48 | 1.80 | 152 | 38 | 45 |
| 13 | 0.96 | 1.82 | 147 | 37 | 47 |
| 14 | 1.92 | 1.83 | 141 | 31 | 50 |
| 15* | 0.97 | 1.88 | 114 | 28 | 69 |
| 16* | 0.48 | 1.81 | 140 | 28 | 30 |
| 17* | 0.48 | 1.80 | 154 | 26 | 49 |
| 18* | 0.48 | 1.80 | 142 | 28 | 62 |

*[1] marks show samples outside the scope of the invention

We claim:

1. An aluminium nitride sintered body composed of a sintered body of aluminum nitride, erbium (Er) metal or its compound and calcium (Ca) metal or its compounds, said sintered body containing 1.8 to 10% by weight of an erbium component calculated as an oxide and more than 0 to not more than 2% by weight of a calcium component calculated as an oxide, and consisting of crystal grains of aluminum nitride and an intergranular phase composed mainly of an aluminate other than Er$_3$Al$_5$O$_{12}$, said sintered body further having a bulk density of 3.2 to 3.6 g/cm$^3$.

2. The sintered body of claim 1 in which the aluminate is at least one aluminate selected from the group consisting of ErAlO$_3$ and Er$_4$Al$_2$O$_9$.

3. The sintered body of claim 1 in which the sintered body contains not more than 2.5% by weight of excessive oxygen calculated as Al$_2$O$_3$, and the mole ratio of Al$_2$O$_3$/Er$_2$O$_3$ is 0.5–5.0.

4. The sintered body of claim 1 in which aluminum nitride is contained in an amount of 88 to 98%.

5. The sintered body of claim 1 which has a heat conductivity of at least 120 W/m.k and a flexural strength of at least 30 kg/mm$^2$.

* * * * *